E. B. WILLIAMS.
AUDIBLE THEFT ALARM SIGNAL FOR AUTOMOBILES.
APPLICATION FILED APR. 21, 1919.

1,339,873.

Patented May 11, 1920.

INVENTOR
EARL B. WILLIAMS
BY Hazard & Miller
ATT'YS.

UNITED STATES PATENT OFFICE.

EARL B. WILLIAMS, OF LOS ANGELES, CALIFORNIA.

AUDIBLE THEFT-ALARM SIGNAL FOR AUTOMOBILES.

1,339,873. Specification of Letters Patent. Patented May 11, 1920.

Application filed April 21, 1919. Serial No. 291,744.

*To all whom it may concern:*

Be it known that I, EARL B. WILLIAMS, a citizen of the United States, residing at Los Angeles, in the county of Los Angeles and State of California, have invented new and useful Improvements in Audible Theft-Alarm Signals for Automobiles, of which the following is a specification.

My object is to make an audible theft alarm signal for automobiles and the like, and my invention consists of the novel features herein shown, described and claimed.

Figure 1:
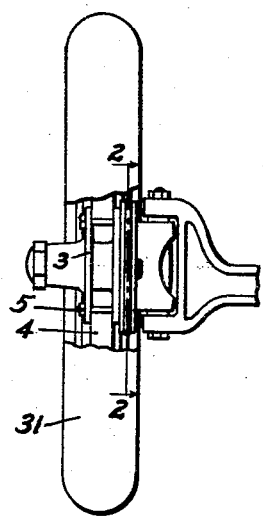
Figure 1 is a fragmentary edge elevation of a wheel showing an audible theft alarm signal for automobiles embodying the principles of my invention.

Referring to the drawing in detail, the casing head 1 fits against the inner face of the hub flange 2, a clamping ring 3 fits against the outer faces of the spokes 4, and bolts 5 are inserted through the clamping ring 3, through the flange 2, and through the casing head 1, and nuts 6 applied to the bolts against the inner face of the casing head 1, so that the nuts will be covered by the other mechanism. An annular casing 7 is formed integral with the casing head 1 and extends inwardly, there being an outwardly projecting bead 8 at the cross sectional center of the casing 7, the bead being concavo-convex to form the integral groove 9.

The bell member 10 is a strip of suitable sheet metal arranged concentric to the casing 7 parallel with the casing and secured at its edge to the casing head 1. The bell member 10 is bent in and out to form the transverse ribs 11, said ribs being evenly spaced apart all the way around to form the striking faces 12 between the ribs.

The second casing head 13 is formed integral with the annular casing 14 and the annular casing 14 fits closely in the casing 7 and has radial slots 15 in line with the groove 9. A supporting clamp 16 is formed of heavy sheet metal bent U-shaped to fit around the knuckle 17, and the ends of the clamp are bent laterally to form flanges 18 fitting against the second casing head 13, and rivets 19 are inserted through the flanges and through the casing head to hold the casing head rigidly in place.

Attaching plates 20, 21, 22, 23 and 24 have longitudinal slots 25 and fit against the inner face of the second casing head 13 in radial positions evenly spaced apart, and the outer ends of the attaching plates are shaped to form dogs 26 extending through the slots 15 into the groove 9. Rivets 27 are inserted loosely through the slots 25 and fixed in the second casing head 13, so that the attaching plates 20, 21, 22, 23 and 24 carrying the dogs 26 may be slid in and out.

Figure 2:
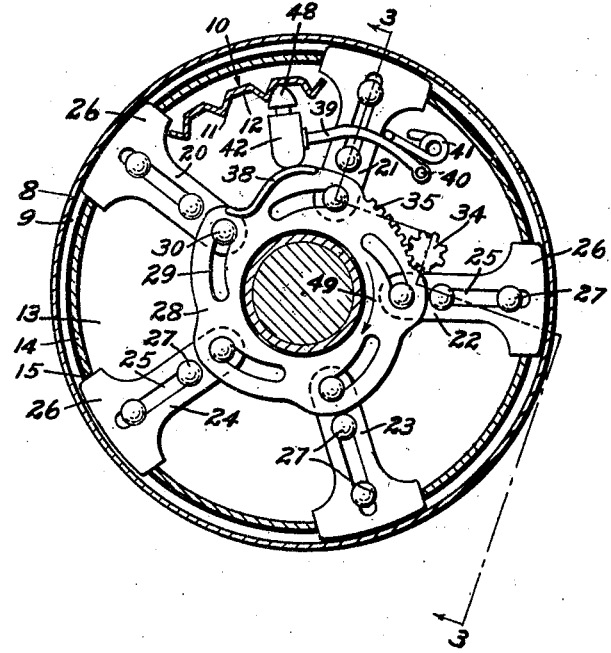
Fig. 2 is an enlarged sectional detail on the lines 2—2 of Figs. 1 and 3 with the axle omitted and looking in the direction indicated by the arrows.
Figure 3:
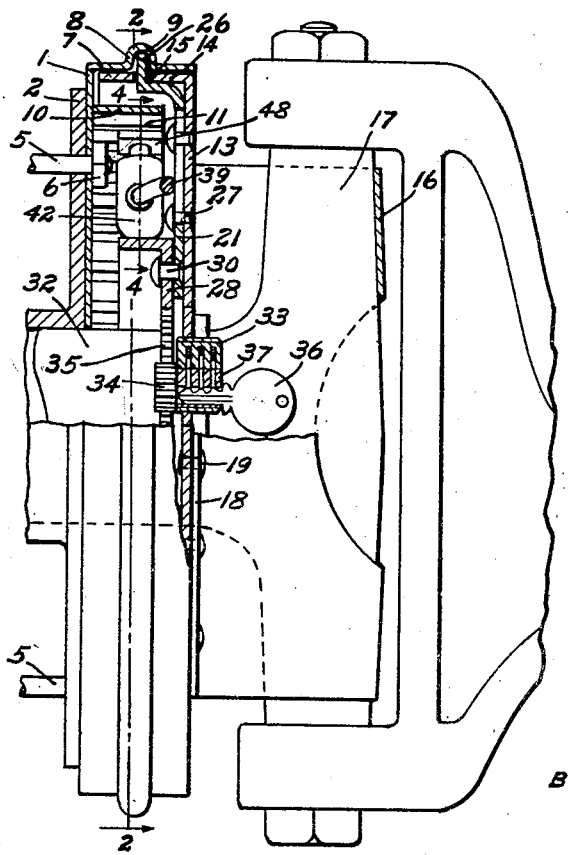
Fig. 3 is an enlarged fragmentary sectional detail on the same plane as Fig. 1 and on the line 3—3 of Fig. 2.
Figure 4:
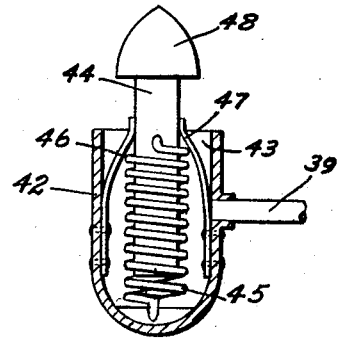
Fig. 4 is an enlarged sectional detail through the clapper with the other parts omitted, the view being taken on the line 4—4 of Fig. 3 and looking in the direction indicated by the arrow.

A cam plate 28 has eccentric grooves 29 one for each attaching plate 20, 21, 22, 23 and 24, and rivets 30 are inserted through the grooves 29 and fixed in the inner ends of the attaching plates, so that when the cam 28 is rotated one way the attaching plates 20, 21, 22, 23 and 24 are moved outwardly to the position shown in Figs. 2 and 3 to lock the casing 7 from being withdrawn from the casing 14 so that the wheel 31 cannot be removed from the axle 32, and so that when the cam 28 is rotated the other way the dogs 26 will be drawn inwardly so that the casing 7 may be removed from the casing 14 as in removing the wheel 31 from the axle 32. A tumbler lock 33 is fixed through the second casing head 13, a pinion 34 is fixed upon the rotatable cylinder of the lock and meshes with a gear rack 35 formed upon the edge of the cam 28, so that when the key 36 is applied to the lock the lock cylinder 37 may be rotated to rotate the pinion 34 to move the rack 35 thereby moving the cam to move the locking dogs 26 one way or the other.

A flange 38 extends inwardly from the cam 28. A clapper arm 39 is pivotally connected to the second casing head 13 by a pin 40, a spring 41 is mounted to press upon the arm 39 to swing the arm inwardly, a clapper housing 42 is fixed to the free end of the arm 39 in position to ride upon the flange 38; the clapper housing 42 has a chamber 43, the clapper stem 44 is mounted to reciprocate in the chamber 43, a coil spring 45 tends to draw the clapper stem 44 outwardly, and leaf springs 46 and 47 tend to hold the clapper stem 44 straight and allow it to yield forwardly or backwardly. The clapper head 48 is formed integral with the outer end of the stem 44 and is in position to engage the ribs 11 and snap over the ribs and strike the striking faces 12.

When the automobile or the like is to be operated the key 36 is manipulated to move the cam 28 in the direction indicated by the arrow 49 in Fig. 2, thereby throwing the locking dogs 26 inwardly and allowing the clapper casing 42 to move inwardly upon the flange 38, so that the wheel 31 may be rotated, thereby rotating the casing 7 without operating the clapper.

When it is desired to lock the alarm and leave the vehicle, the key 36 is manipulated to move the cam 28 in the other direction from the arrow 49, thereby forcing the locking dogs 26 outwardly and raising the clapper casing 42 to bring the clapper head 48 into engagement with the bell member 10; then if the vehicle is started the clapper head 48 will snap over the ribs 11 and make an alarm.

Especial attention is called to the fact that the parts are absolutely inaccessible and that the alarm cannot be stopped except by using the key 36, and that the wheel 31 cannot be removed from the axle, or the parts removed from the wheel without cutting or breaking the parts.

Various changes may be made without departing from the spirit of my invention as claimed.

I claim:

1. A theft alarm for vehicles, comprising a casing attachable to the axle of the vehicle, a casing attachable to a wheel on the axle, means for interlocking the casings together, means carried by the casing structure for giving an audible alarm upon rotation of the wheel, and a lock for setting the mechanism in the casing in operative and inoperative positions.

2. An audible theft alarm signal for automobiles and the like comprising a casing adapted for attachment to a wheel, a second casing adapted for attachment to an axle and fitting the first casing, the two casings having means for locking them together, bell and clapper mechanism within the casings and adapted to be operated by the rotation of the wheel, and lock means for throwing the clapper into and out of operation.

3. An audible theft alarm signal for automobiles and the like comprising a casing adapted for attachment to a wheel, a second casing adapted for attachment to an axle and fitting the first casing, alarm mechanism mounted in the casings and adapted to be operated by the rotation of the wheel, lock mechanism for throwing the alarm mechanism into and out of operation, and means for locking the casings together.

4. A theft alarm for vehicles, comprising a casing for attachment to an axle of the vehicle, a casing attachable to a wheel on the axle, the casings relatively rotatable; dogs for locking the casings assembled; signal mechanism operative upon relative rotation of the casings, and a device for setting the dogs and said mechanism in operative and inoperative positions.

5. An automobile theft signal device comprising a casing attachable to an axle part of the vehicle and a complementary casing attachable to a wheel thereon; means for locking the casings in assembled relation and permitting relative rotating movement; and means within the casings for producing an audible signal upon rotation of the wheel and casing secured thereto.

6. An automobile theft signal device comprising a casing attachable to an axle part of the vehicle and a complementary casing attachable to a wheel thereon; means for locking the casings in assembled relation and permitting relative rotating movement; means within the casings for producing an audible signal upon rotation of the wheel and casing attached thereto and a key controlled lock for setting the contained mechanisms in operative and in inoperative positions.

7. A theft alarm for vehicles including a casing attachable to the axle of the vehicle, a casing attachable to a wheel on the vehicle axle, interlocking means for said casings for preventing relative axial movement of said casings, but allowing rotation of the casing attached to the wheel with relation to the casing attached to the axle; means carried by casing structure for giving an audible alarm upon rotation of the wheel and a lock controlling said interlocking means and said audible alarm means.

In testimony whereof I have signed my name to this specification.

EARL B. WILLIAMS.